United States Patent [19]

Boutni et al.

[11] Patent Number: 4,638,033

[45] Date of Patent: Jan. 20, 1987

[54] RESINOUS COMPOSITION OF A CARBONATE RESIN AND A GRAFTED DERIVATIVE OF ETHYLENE-PROPYLENE-DIENE TERPOLYMER EXHIBITING IMPROVED RESISTANCE TO ORGANIC SOLVENTS

[75] Inventors: Omar M. Boutni, Mt. Vernon, Ind.; Ping Y. Liu, Naperville, Ill.

[73] Assignee: General Electric Company, Mt. Vernon, Ind.

[21] Appl. No.: 812,264

[22] Filed: Dec. 23, 1985

[51] Int. Cl.$^4$ ............................................. C08L 69/00
[52] U.S. Cl. .................................... 525/67; 524/504; 525/71; 525/146; 525/148; 525/901
[58] Field of Search ............... 525/67, 148, 468, 146, 525/901

[56] References Cited

U.S. PATENT DOCUMENTS

| 4,515,921 | 5/1985 | Witman | 525/67 |
| 4,532,282 | 7/1985 | Liu et al. | 524/157 |
| 4,537,930 | 8/1985 | Bussink et al. | 524/505 |

FOREIGN PATENT DOCUMENTS 0131188  1/1985  European Pat. Off. .

Primary Examiner—Theodore E. Pertilla
Attorney, Agent, or Firm—Myron B. Kapustij; Martin B. Barancik

[57] ABSTRACT

A resin composition comprising:
(i) a blend of at least one aromatic carbonate resin and at least one grafted derivative of an ethylene-propylene-diene terpolymer; and
(ii) an amount at least effective to improve the impact properties and resistance to organic solvents of said blend of at least one polymer selected from
 (a) a polyolefin,
 (b) an olefin-acrylate or methacrylate copolymer, or
 (c) at least one selectively hydrogenated linear, sequential or radial teleblock copolymer of a vinyl aromatic compound and an olefin elastomer.

38 Claims, No Drawings

RESINOUS COMPOSITION OF A CARBONATE RESIN AND A GRAFTED DERIVATIVE OF ETHYLENE-PROPYLENE-DIENE TERPOLYMER EXHIBITING IMPROVED RESISTANCE TO ORGANIC SOLVENTS

BACKGROUND OF THE INVENTION

The present invention relates to compositions comprising blends of resins. More particularly it relates to blends of aromatic polycarbonate resins and graft derivatives of ethylene-propylene-diene terpolymers which contain an amount of an impact modifying compound effective to positively upgrade the impact properties of said blends and to improve the resistance of said blends to organic solvents.

The aromatic polycarbonate resins are well known in the art and, due to their many advantageous properties, are used as thermoplastic engineering materials. The polycarbonates exhibit, for example, good impact strength and good heat resistance.

Polycarbonate resins have been blended with other thermoplastic materials such as high molecular weight polymeric glycol esters of terephthalic and/or isophthalic acid; and acrylonitrilebutadiene-styrene terpolymers (ABS). Mixtures of polycarbonates with ABS graft copolymers are disclosed to have improved impact properties in U.S. Pat. No. 4,172,103. However, it is disclosed in U.S. Pat. Nos. 3,130,177 and 3,852,393 that impact resistance of polycarbonate resins tends to be lowered by blending them with ABS resins.

The blending art, particularly when dealing with polycarbonates, is thus generally a complex and somewhat unpredictable area where the empirical approach is still generally the rule rather than the exception. Thus, in order to provide a useful binary blend of a polycarbonate with other resins the two resins must be compatible, they must be combinable over certain useful concentrations, and the blend should exhibit a combination of the various advantageous properties of the resins rather than the individual properties of the neat resins. The formulation of blends containing three or more different resins is fraught with a much higher degree of complexity and unpredictability.

Grafted derivatives of ethylene-propylene-diene terpolymers and compositions of such polymers with other resins are known in the art and described in the patent literature. It has been disclosed, for example, that olefinic copolymers and terpolymers can be grafted with styrene, styrene-acrylonitrile, methyl methacrylate, styrene-methyl methacrylate, and the like, to provide thermoplastics which can be further blended, e.g., with styrene-acrylonitrile, and molded, extruded or vacuum formed into articles having good tensile and impact strengths. Polymers of this type and methods for their preparation are described in U.S. Pat. Nos. 4,202,948 and 4,166,081, the former being incorporated by reference. Thermoplastic resin blends of polysulfone resins and graft derivatives of ethylene-propylene terpolymers are disclosed in U.S. Pat. No. 3,641,207 to have good processability and impact resistance over relatively narrow concentration ranges.

Aromatic polycarbonate resins and derivatives of ethylene-propylene-diene terpolymers are combinable with each other over a wide range of concentrations and provide compositions which exhibit advantageous properties after molding. Such properties are obtainable over a wide range of compositions. Especially noteworthy properties are high gloss on the surface of articles molded from these compositions and improved resistance to environmental stress crazing and cracking as compared to aromatic polycarbonate resins. Environmental stress crazing and cracking refer to the type of failure which is hastened by the presence of organic solvents such as, for example, gasoline, acetone, heptane and carbon tetrachloride when such solvents are in contact with stressed parts fabricated from aromatic polycarbonate resins. The most siginificant effect is a loss in the impact strength and an increase in brittle type failure.

While these blends of polycarbonates and graft derivatives of ethylene-propylene-diene terpolymers are useful in a wide variety of applications there exist certain situations which require greater impact strength and better resistance to environmental stress crazing and cracking than possessed by these blends. It is, therefore, an object of the instant invention to provide polycarbonate/graft derivatives of ethylene-propylene-diene terpolymer compositions exhibiting improved impact properties and improved resistance to organic solvents.

SUMMARY OF THE INVENTION

The instant invention is directed to a resinous composition exhibiting improved impact properties and resistance to organic solvents comprised of:

(i) a blend of at least one aromatic carbonate resin and at least one graft derivative of ethylene-propylene-diene terpolymer; and (ii) an amount effective to improve the impact properties and resistance to organic solvents of said blend of at least one polymer selected from
  (a) a polyolefin, (b) an olefin-acrylate or methacrylate copolymer, or
  (c) a selectively hydrogenated linear, sequential, or radial teleblock copolymer of a vinyl aromatic compound and an olefinic elastomer.

DESCRIPTION OF THE INVENTION

It has been discovered that compositions of polycarbonates and grafted derivatives of ethylene-propylene-diene terpolymers can be provided which exhibit better impact properties, e.g., impact strength, and resistance to organic solvents, and which simultaneously retain, to a substantial degree, substantially most of the advantageous properties of the binary blends.

According to the present invention there are provided compositions exhibiting improved impact properties and resistance to organic solvents comprised of, in admixture:

(i) a blend of at least one aromatic polycarbonate resin and at least one grafted derivative of ethylene-propylene-diene terpolymer, and (ii) an amount at least effective to improve the impact properties and resistance to organic solvents of said blend of at least one polymer selected from
  (a) a polyolefin,
  (b) an olefin-acrylate or methacrylate copolymer, or
  (c) a selectively hydrogenated linear, sequential, or radial teleblock copolymer of a vinyl aromatic compound and an olefinic elastomer.

The high molecular weight aromatic polycarbonate resin utilized in the blends (i) is well known in the art and is amply described in the patent literature, e.g., U.S. Pat. Nos. 3,161,615, 3,220,973, 3,312,660, 3,312,659, 3,313,777, 3,666,614 and 3,939,672, all of which are incorporated by reference.

These polycarbonates contain at least the following recurring structural unit

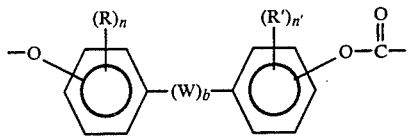
I.

wherein:

R and R' are independently selected from monovalent hydrocarbon radicals, monovalent hydrocarbonoxy radicals, and halogen radicals;

W is selected from divalent hydrocarbon radicals,

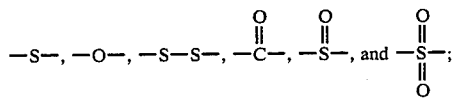

n and n' are independently selected from integers having a value of from 0 to 4 inclusive; and b is either zero or one.

The monovalent hydrocarbon radicals represented by R and R' include the alkyl, cycloalkyl, aryl, aralkyl, and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms.

The monovalent hydrocarbonoxy radicals may be represented by the general formula —OR$^1$ wherein R$^1$ is a monovalent hydrocarbon radical of the type described hereinafore. Preferred hydrocarbonoxy radicals are the alkoxy and aryloxy radicals.

The preferred halogen radicals represented by R and R' are chlorine and bromine.

The divalent hydrocarbon radicals represented by W include the alkylene radicals, the alkylidene radicals, the cycloalkylene radicals, and the cycloalkylidene radicals. Preferred alkylene radicals are those containing from 2 to about 30 carbon atoms. Preferred alkylidene radicals are those containing from 1 to about 30 carbon atoms. Preferred cycloalkylene and cycloalkylidene radicals are those containing from 6 to about 16 ring carbon atoms.

These polycarbonates may be conveniently prepared by the reaction of a dihydric phenol with a carbonate precursor. Typically, the dihydric phenols used may be represented by the formula

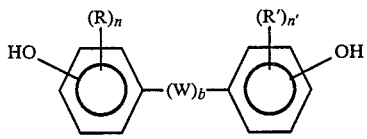
II.

wherein R, R', W, n, n' and b are as defined hereinafore.

Some illustrative non-limiting examples of these dihydric phenols include:
2,2-bis(4-hydroxyphenyl)propane (bisphenol-A);
bis(4-hydroxyphenyl)methane;
2,2-bis(3,5-dimethyl-4-hydroxyphenyl)propane;
2,2-bis(3,5-dibromo-4-hydroxyphenyl)propane;
1,1-bis(4-hydroxyphenyl)decane;
1,1-bis(4-hydroxyphenyl)cyclohexane;
1,1-bis(3,5-dimethyl-4-hydroxyphenyl)cyclohexane;
1,1-bis(4-hydroxyphenyl)cyclododecane;
4,4'-thiodiphenol; and
bis(4-hydroxyphenyl)ether.

Other dihydric phenols are also available and are disclosed, inter alia, in U.S. Pat. Nos. 2,999,835, 3,028,365, and 3,334,154, all of which are incorporated by reference.

It is, of course, possible to employ a mixture of two or more different dihydric phenols as well as individual dihydric phenols in the preparation of the instant polycarbonates.

Preferred polycarbonates of Formula I are the para, para-polycarbonates, i.e., polycarbonates containing at least the following recurring structural unit:

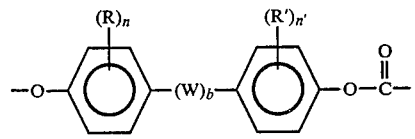
Ia.

wherein R, R', W, n, n' and b are as defined hereinafore. Particularly useful polycarbonates of this type are those wherein b is one and W represents a divalent hydrocarbon radical of the type described hereinafore.

The carbonate precursor employed may be a carbonyl halide, a carbonate ester, or a bishaloformate. The carbonyl halides are carbonyl bromide, carbonyl chloride, and mixtures thereof. Typical of the carbonate esters are diphenyl carbonate; di(halophenyl) carbonates such as di(chlorophenyl)carbonate and di(bromophenyl)carbonate; di(alkylphenyl)carbonates such as di(tolyl)carbonate; and di(naphthyl)carbonate.

The bishaloformates include the bishaloformates of dihydric phenols such as bisphenol-A and hydroquinone; bishaloformates of glycols such as ethylene glycol, neopentyl glycol, and polyethylene glycol; and the like.

These polycarbonates may be prepared by well known conventional processes such as the interfacial polymerization process, transesterification, and melt polymerization. Some of these processes are described, inter alia, in U.S. Pat. Nos. 4,018,750, 4,123,436 and 3,153,008, all of which are incorporated by reference.

Included within the scope of the term polycarbonates are the randomly branched aromatic thermoplastic polycarbonates. These randomly branched polycarbonates may be conveniently prepared by the coreaction of a dihydric phenol, a carbonate precursor, and a minor amount of a branching agent. The branching agents are well known in the art and are generally polyfunctional aromatic compounds which contain at least three functional groups which may be hydroxyl, carboxyl, carboxylic anhydride, haloformyl, or mixtures thereof. These polyfunctional aromatic compounds are disclosed, inter alia, in U.S. Pat. Nos. 3,525,712, 3,541,049, 3,544,514, 3,635,895, 3,816,373, 4,001,184, 4,204,047 and 4,194,953, all of which are incorporated herein by reference.

Also included within the scope of the instant invention are the copolyester-carbonates. These copolyester-carbonates, as well as methods for their preparation, are well known in the art and are described, inter alia, in U.S. Pat. No. 3,169,121, The copolyester-carbonates contain recurring carbonate groups, carboxylate groups, and aromatic carbocyclic groups in the linear polymer chain in which at least some of the carbonate groups and at least some of the carboxylate groups are bonded directly to the ring carbon atoms of the aromatic carbocyclic groups.

These copolyester-carbonates contain ester bonds and carbonate bonds in the polymer chain, wherein the amount of ester bonds is in the range of from about 25 to about 90 mole percent, preferably from about 35 to about 80 mole percent. Thus, for example, 5 moles of bisphenol A reacting completely with 4 moles of isophthaloyl dichloride and one mole of phosgene would give a copolyester-carbonate containing 80 mole percent ester bonds.

The copolyester-carbonates of the instant invention may be conveniently prepared by the reaction of at least one dihydric phenol, a carbonate precursor, and at least one ester precursor. The ester precursor may be, without limitation, a difunctional aromatic carboxylic acid or an ester forming reactive derivative thereof. Some useful difunctional carboxylic acids include isophthalic acid, terephthalic acid, and mixtures thereof. Instead of using the difunctional carboxylic acids it is perferred to utilize their ester forming reactive derivatives, such as the acid dihaldes. Thus, for example, instead of using isophthalic acid, terephthalic acid, or mixtures thereof it is preferred to use isophthaloyl dichloride, terepthaloyl dichloride, or mixtures thereof.

The grafted derivatives of ethylene-propylene-diene terpolymers which form the second component of the blends of (i) are well known in the art and are generally commercially available, e.g., under the trade designation ROVEL ® from Uniroyal Inc., or may be readily prepared by known methods. These resins may be characterized as an ethylene-propylenenon-conjugated diene interpolymer grafted with the homopolymer or copolymer of monoethylenically unsaturated monomers as disclosed in U.S. Pat. No. 4,202,948, for example, styrene, styrene-acrylonitrile, methyl methacrylate or styrene-methyl methacrylate, halostyrenes, alpha methylstyrene, p-methylstyrene acrylonitrile, methacrylonitrile, acrylic acid, methacrylic acid, the lower alkyl esters of acrylic acid and methacrylic acid, styrene maleic anhydride and the like.

More particularly, the second component of the blends of (i) is a resinous composition of (I) polymerized alkenyl aromatic units and/or (II) polymerized acrylic units, in combination with (III) a rubbery terpolymer comprising copolymerized units of ethylene and propylene and a non-cojugated diolefin. Preferably this second component of (i) is a graft copolymer produced by polymerizing the resin forming alkenyl aromatic monomer and the acrylic monomer in the presence of a rubbery terpolymer of ethylene, propylene and a non-conjugated diolefin.

The non-conjugated dienes used in the preparation of the terpolymer elastomers may include open chain nonconjugated dienes such as 1,4-hexadiene and also cyclic (especially bridged ring) nonconjugated dienes such as dicyclopentadiene, 5-methylene-2-norbornene, 5-ethylidene-2-norbornene and 1,4-cyclooctadiene. The respective weight ratios of ethylene to propylene in the elastomers may range from 40:60 to 75:25. The content of the additional monomer, such as the non-conjugated diene, in the terpolymer can range from about 1% to about 20% by weight. The preferred diene is 5-ethylidene-2-norbornene.

Methods for the preparation of the foregoing rubbery terpolymers are described in U.S. Pat. Nos. 2,933,480, 3,000,866, and 3,000,867.

The resin forming monomers useful for copolymerization with the described rubbery copolymers and terpolymers include styrene, alpha-methylstyrene, p-methylstyrene and other alkyl ring substituted styrenes and acrylics such as acrylonitrile, acrylates and alkacrylates. The ester portion of the acrylate is generally alkyl from one to about 8 carbon atoms, inclusive, preferably from one to about 6 carbon atoms, inclusive. The "alk" portion of the "alkacrylate" is alkyl of one to three carbon atoms, inclusive. Examples of acrylate and alkacrylate include ethylacrylate, n-butyl acrylate, 2-ethylhexylacrylate, methylmethacrylate, propylethacrylate and isopentylpropacrylate. Mixtures of styrenics and acrylates can also be employed. Especially preferred are mixtures of styrene and acrylonitrile.

As explained above the graft copolymers are prepared by polymerizing the resin forming monomers, e.g. styrene and acrylonitrile, in the presence of rubbery terpolymer, e.g., ethylene-propylene-diene. In one procedure, the rubbery terpolymer is dissolved in an inert organic solvent, e.g., benzene, to form a cement, to which is added the desired amount of the resin forming monomers and a radical initiator, e.g., peroxide. The mixture is heated to decompose the initiator and to polymerize the monomers. The graft copolymer which results is isolated, e.g., by precipitation with an anti-solvent such as methanol.

The evidence indicates that at least a portion of the resin grafts onto the rubber to form a graft copolymer made up of a rubbery spine or backbone polymer and resinous side chains.

The proportion of resin forming monomers to rubber used in the graft polymerization can vary, for instance, from 1:4 to 4:1, on a weight basis.

The graft copolymers and methods of their preparation are described in greater detail by F. X. O'Shea in U.S. Pat. No. 3,642,950, and by Albert Fournier, Jr. and Charles Paddock in U.S. Pat. No. 4,166,081, both of which are incorporated herein by reference.

Since the carbonate resins and the grafted derivatives of ethylene-propylene-diene terpolymers are combinable in widely variant proportions the blends (i) can contain wide ranges of these two resins, for example, from 5 to 95 parts by weight of carbonate resin and from 95 to 5 parts by weight of said grafted derivative per 100 parts by weight of said carbonate resin and said grafted derivative combined with the particular amount being dependent on specific requirements. A particularly useful ratio is from 60 to about 95 parts by weight of carbonate resin and about 5 to about 40 parts by weight of said grafted derivative of ethylene-propylene-diene terpolymer.

Component (ii) of the instant compositions is selected from (a) polyolefins, (b) olefinacrylate or methacrylate copolymers, or (c) selectively hydrogenated linear, sequential or radial teleblock copolymer of a vinyl aromatic compound and an olefinic elastomer. The polyolefins of (ii) (a) are well known in the art and are generally commercially available or may be readily prepared by known methods. The polyolefin may be an olefin homopolymer or a copolymer. It is selected from among materials well known in the art as comprising this class. Preferred for use in this invention are polymers which have been derived from olefin monomers containing from 2 to 10 carbon atoms. Particularly useful are polyethylene, polypropylene, polyisobutylene and ethylene-propylene copolymers since these are the most readily available commercially.

Methods for the preparation of these polymers, both commercial and non-commercial, are abundantly described in the literature and known to those skilled in the art. The polyethylenes can be prepared by various procedures using anionic, cationic, or free-radical initiating catalysts, with conditions varied to produce a range of molecular weights and densities and various degrees of branching or non-branching for the polymer. In one procedure, which involves free radical initiation, ethylene gas is polymerized in the presence of a peroxide catalyst at a pressure between 15,000 and 40,000 psi and a temperature between 100° and 200° C., to produce a relatively low density polymer, 0.90 to 0.94 g/cm$^3$.

The polyethylene can also be prepared by low pressure processes effective to attain a polymer of higher molecular weight and a higher density. In one such procedure, known as the Phillips process, ethylene is contacted in and inert solvent with a slurry of a catalyst, such as chromium oxide supported on silica-alumina, at pressures of 400 to 500 psig and temperatures of 130° to 170° C., followed by extraction of the polymer with hot solvent and purification, to produce a polyethylene product having a density between 0.96 to 0.97 g/cm$^3$.

Still other procedures are possible, such as emulsion polymerization in aqueous media in the presence of a peroxy compound, as well as suspension polymerization at low temperatures using a silver salt-peroxide redox system.

Any of the foregoing processes are utilizable to obtain polymers of ethylene suitable for use in the present invention.

Also employable as component (ii) (a) is polypropylene, a common commercial form of which is crystalline isotactic polypropylene. Such polymers can be prepared by anionically initiated reactions using Ziegler type catalysts, e.g., titanium halide such as TiCl$_3$ in combination with an organometallic co-catalyst such as trialkyl aluminum halide. Polymerization generally proceeds rapidly at temperatures between 25° C. and 100° C. to yield a polymer in the form of a slurry of insoluble granular powder.

Copolymers of ethylene and propylene can be prepared using procedures similar to those for polyethylene and other polyolefins; for instance, by the polymerization reaction of a mixture of ethylene and propylene in the presence of a Ziegler type catalyst, or by free radical initiation under high pressures.

Polymers based on still higher olefins are not as readily available and, therefore, not as preferred. Examples of such higher polyolefins are polymers based on 3-methyl-1-butene, 1-pentene, 4-methyl-1-pentene, and isobutylene. They can be prepared by known procedures including those described in The Encyclopedia of Polymer Science and Technology, John Wiley & Sons, Inc. Volume 9, pages 440–460 (1965).

Preferred polyolefins are the linear low density polyolefins, particularly linear low density polyethylene. These linear low density polyolefins may be prepared by state-of-the-art polymerization processes such as those described in U.S. Pat. No. 4,078,698 and Eur. Pat. Appl. No. 4,645, both of which are incorporated by reference. The polymer may have a density between 0.89 and 0.96 g/cc. and a controlled concentration of simple side branching as opposed to random branching which distinguishes it from polymers such as high pressure low density polyethylene and high density polyethylene. The preferred range of density is 0.915 to 0.945 g/cc. The linear low density polymers are preferably made from ethylene and an alpha olefin of C$_3$ to C$_8$ carbon content. e.g., butene-1 and octene-1, or mixtures of such alpha olefins. The comonomer is used in minor amounts, e.g., 10 mol % or less of the total amount of monomers. A preferred range is about 1–3 mol %. A particularly useful copolymer is a copolymer made from ethylene and butene-1 such as ESCORENE ® LPX-15 of Exxon, Houston, Tex.

Component (ii) (b), i.e., an olefin-acrylate or methacrylate copolymer, is well known in the art and is generally commercially available or may be readily prepared by conventional methods. It is made from an olefin, e.g., ethylene, propylene, or the like, copolymerized with one or more of a comonomer comprising a C$_1$–C$_6$ alkyl acrylate, e.g., methyl acrylate, ethyl acrylate, hexyl acrylate and the like; a C$_1$–C$_6$ alkyl methacrylate, e.g., methyl methacrylate, ethyl methacrylate, hexyl methacrylate and the like; acrylic acid; or methacrylic acid. Especially preferred are the well known copolymers of ethylene with an alkyl ester of acrylic acid. These are disclosed in U.S. Pat. No. 2,953,551, incorporated herein by reference. Generally, the acrylate or methacrylate portion of the copolymer can range from about 10 to about 30 weight percent. The olefin portion of the copolymer can range from about 70 to about 90 weight percent. A particularly useful copolymer of this type is an ethylene ethyl acrylate copolymer in which the weight ratio of the ethylene fraction to ethyla acrylate fraction is about 4.5 to 1. Suitable olefin-acrylate copolymers as defined above can be prepared by methods well known to those skilled in the art, or they may be obtained commercially, for example, Union Carbide's BAKELITE ® DPD-6169 which is an ethylene ethyl acrylate copolymer.

Component (ii) (c), i.e., a selectively hydrogenated linear, sequential or radial teleblock copolymer of a vinyl aromatic compound and an olefinic elastomer, is likewise well known in the art and is generally commercially available or may be readily prepared by known methods. This resin may be more particularly characterized as a selectively hydrogenated linear, sequential, or radial teleblock copolymer resin of a vinyl aromatic compound A$_c$ and A'$_c$ and an olefinic elastomer B of the A-B-A, A-(B-A-B)$_c$-A, A-(BA)$_c$-B, (A)$_4$B, B(A)$_4$, or B((AB)$_c$B)$_4$ type, wherein c is an integer of from 1 to 10.

Prior to hydrogenation the end blocks of these polymers comprise homopolymers or copolymers preferably prepared from alkenyl aromatic hydrocarbons and particularly vinyl aromatic hydrocarbons wherein the aromatic moiety may be either monocyclic or polycyclic. Typical monomers include styrene, alpha-methyl styrene, p-methyl styrene, vinyl xylene, ethyl vinyl xylene, vinyl naphthalene, and the like, or mixtures thereof. The end blocks A and A' may be the same or different. They are preferably selected from styrene, alpha-methyl styrene, vinyl toluene, vinyl xylene, vinyl naphthalene and the like, especially styrene. The center block B may be derived, for example, from butadiene, isoprene, 1,3-pentadiene, 2,3-dimethylbutadiene, and the like, and it may have a linear, sequential or teleradial structure.

The selectively hydrogenated linear block copolymers are described by Haefele et al. in U.S. Pat. No. 3,333,024, which is incorporated herein by reference.

The ratio of the copolymers and the average molecular weights can vary broadly although the molecular weight of the center block should be greater than that of the combined terminal blocks. It is preferred to form terminal blocks A each having a weight average molecular weight of about 2,000 to 60,000 and center block B, e.g., a hydrogenated polybutadiene block, have a weight average molecular weight of about 20,000 to 450,000. Still more preferably, the terminal blocks each have a weight average molecular weight of about 7,000 to 35,000 while the hydrogenated polybutadiene polymer blocks have a weight average molecular weight between about 30,000 and 150,000. The terminal blocks will preferably comprise about 20 to 45% by weight, or more preferably, about 25 to 40% by weight, of the total block copolymer. The preferred copolymers will be those having a polybutadiene center block wherein 35 to 55% of the butadiene block segment is the structure resulting from 1,2-addition.

The hydrogenated copolymers will have the average unsaturation reduced to less than 20% of the original value. It is preferred to have the unsaturation of the center block B reduced to 10% or less, preferably 5% or less of its original value. After hydrogenation, center blocks B derived from isoprene will have the EB (ethylenebutylene) structure.

The block copolymers are formed by techniques well known to those skilled in the art. Hydrogenation may be conducted utilizing a variety of hydrogenation catalysts such as nickel on kieselguhr, Raney nickel, copper chromate, molybdenum sulfide and finely divided platinum or other noble metals on a low surface area carrier.

Hydrogenation may be conducted at any desired temperature or pressure, from atmospheric to 21.1 kg f/cm$^2$, the usual range being between 11 and 70 kg f/cm$^2$, at temperatures from 28° C. to 316° C. for times between 0.1 and 24 hours, preferably from 0.2 to 8 hours.

Hydrogenated block copolymers such as KRATON ® G-1650 and KRATON ® G-1651 from Shell Chemical Company, Polymers Division, have been found usable according to the present invention. Also usable are the SOLPRENE ® resins of Phillips and the FINAPRENE ® resins of Petrofina, S.A.

The radial teleblock copolymers, of which the SOLPRENE ® resins are typical examples, can be characterized as having a least three polymer branches with each branch of the radial teleblock polymer comprising terminal non-elastomeric segments, e.g., A and A' as defined hereinafore. The branches of the radial block polymer contain a terminal non-elastomeric segment attached to an elastomeric polymer segment, e.g., B, as defined hereinafore. These are described in Marrs, U.S. Pat. No. 3,753,936, and in Zelinski, U.S. Pat. No. 3,281,383, both of which are incorporated herein by reference, and they are selectively hydrogenated by procedures well known in the art. In any event, the term "selective hydrogenation" is used herein to contemplate polymers in which the non-elastomeric blocks A and A' have been left unhydrogenated, i.e., aromatic.

The amount of component (ii) present in the instant compositions is an amount which is effective to improve or positively upgrade the impact properties, e.g., impact strength, and resistance to organic solvents of the blend (i). Generally, this amount is at least about 1 weight percent, preferably at least about 2 weight percent, and more preferably at least about 3 weight percent. The upper limit of component (ii) is an amount which is insufficient to substantially alter or substantially deleteriously affect, to a substantial degree, substantially most of the advantageous properties of blend (i). Generally, an amount of about 30 weight percent should not be exceeded, preferably an amount of about 25 weight percent, and more preferably an amount of about 20 weight percent. Weight percent of component (ii) is measured as the amount of (ii) present in the total amounts of (i) and (ii) in the composition.

In a preferred embodiment component (ii) contains only one of (a), (b), or (c). That is to say, component (ii) contains (a) or (b) or (c) and not mixtures of (a)–(c). In said preferred embodiment the compositions contain no glass such as, for example, glass fibers.

In another preferred embodiment blend (i) contains either a polycarbonate resin or a copolyestercarbonate resin, i.e., it does not contain mixtures of polycarbonate and copolyester-carbonate resins.

The instant compositions may be readily prepared by physically admixing the various components together. Thus, for example, the instant compositions may be prepared by first forming blend (i) by admixing together the carbonate resins and the grafted derivative of ethylene-propylene-diene terpolymer, and then mixing this blend with the desired amount of component (ii). Alternately, a composition of the instant invention may be prepared by mixing together a carbonate resin, a grafted derivative of ethylene-propylene-diene terpolymer, and component (ii).

The compositions of this invention may be used to form molded, extruded or vacuum formed parts. These compositions are especially useful for the production of molded parts having glossy surfaces and improved resistance to environmental stress crazing and cracking.

The compositions of the instant invention may optionally have admixed therewith the various and well known additives such as, for example, antioxidants; antistatic agents; mold release agents; hydrolytic stabilizers such as the epoxides; color stabilizers such as the organophosphites; colorants; ultraviolet radiation stabilizers such as the benzophenones, benzotriazoles, cyanoacrylates, and benzylidene malonates; and flame retardants.

The flame retardants which may be utilized include the alkali and alkaline earth metal salts of organic sulfonic acids. These salts are described, inter alia, in U.S. Pat. Nos. 3,933,734, 3,948,851, 3,926,908, 3,919,167, 3,909,490, 3,953,397, 3,931,100, 3,978,024, 3,953,399, 3,917,559 3,951,810, 3,940,366, 3,775,367 and 3,836,490. all of which are incorporated by reference.

Conventional well known flame retardants other than the above salts may also be employed. These conventional flame retardant additives generally contain a halogen, preferably chlorine and/or bromine. That is to say, they are a halogen source. They may be inorganic or preferably organic. Typical of the inorganic halogen sources are NaCl, KBr, KCl, etc. The preferred organic halogen sources are preferably aromatic and may be either monomers or polymers. Typical aromatic monomers include the halodiphenyl ethers such as tetrabromodiphenyl ether, etc. Typical aromatic polymers include those derived from halogenated dihydric phenols such as, for example, a polycarbonate derived from tetrabromobisphenol-A or a carbonate copolymer derived from tetrabromobisphenol-A and bisphenol-A.

The flame retardant additives are present in flame retardant amounts, i.e., amounts which are effective to render said compositions flame retardant.

DESCRIPTION OF THE PREFERRED EMBODIMENT

In order that those skilled in the art may better understand how the present invention may be practiced the following examples are given by way of illustration and not be way of limitation. In the examples all parts and percentages are parts and percentages by weight unless otherwise specified.

The following example illustrates a composition falling outside the cope of the instant invention.

EXAMPLE 1

This example, which is the control, illustrates a blend of aromatic polycarbonate resin and a graft copolymer of styreneacrylonitrile on an ethylenepropylene-5-ethylidene-2-norbornene terpolymer.

A composition is prepared by tumble mixing 20 parts by weight of a graft copolymer of styreneacrylonitrile on an ethylene-propylene-5ethylidene-2-norbornene (ROVEL ® 401—Uniroyal, Inc.) with 80 parts by weight of an aromatic polycarbonate resin derived from bisphenol-A and phosgene (LEXAN ® resin—General Electric Company). The resulting blend is extruded at 255° C. and injection molded at 260° C. into test specimens measuring 63.5mm×12.7mm×3.2 mm thick and 63.5 mm×12.7 mm×6.4 mm thick. The Heat Deflection Temperature Under Load (HDTUL) at 18.6 kgf/cm² of these test specimens is determined according to ASTM D648, and the results are set forth in Table I. The Notched Izod impact strength, in kgf-cm/cm, of these test specimens is determined according to ASTM DZ256, and the results are set forth in Table I.

The following examples illustrate the compositions of the instant invention.

EXAMPLE 2

Test specimens are prepared substantially in accordance with the procedure of Example 1 except that a composition is prepared by mixing 85 parts by weight of the polycarbonate of example 1, 10 parts by weight of the graft derivative of Example 1, and 5 parts by weight ethylene ethylacrylate (DPD 6169—Union Carbide).

The Heat Deflection Temperature Under Load and Notched Izod impact strength of these tests specimens are determined and the results are set forth in Table I.

EXAMPLE 3

The procedure of Example 2 is substantially repeated except that the 5 parts by weight of the ethylene ethylacrylate are replaced with 5 parts by weight of linear low density polyethylene (LPX-15—Exxon).

The Heat Deflection Temperature Under Load and Notched Izod impact strength of these test specimens are determined and the results are set forth in Table I.

EXAMPLE 4

The procedure of Example 1 substantially repeated except that a composition is prepared by mixing 80 parts by weight of the polycarbonate of Example 1, 10 parts by weight of said graft derivative of Example 1, and 10 parts by weight of the ethylene ethylacrylate of Example 2.

The Heat Deflection Temperature Under Load and Notched Izod·impact strength of these tests specimens are determined and the results are set forth in Table I.

EXAMPLE 5

Test specimens are prepared susbtantially in accordance with the procedure of Example 1 except that a composition is prepared by mixing together 85 parts by weight of the polycarbonate resin of Example 1, 5 parts by weight of the graft derivative of Example 1, and 10 parts by weight of a selectively hydrogenated teleblock copolymer of a vinyl aromatic compound and an olefinic elastomer (KRATON ® G-1651 from Shell).

In addition, some of the test specimens of Examples 1-5 are mounted on an ASTM stress jig (0.7% strain/141kgf/cm²)and soaked at room temperature for two hours in AMOCO unleaded premium gasoline. These specimens are then removed from the jig, the gasoline is allowed to evaporate at room temperature for 24 hours, and the specimens are then subjected to the Notched Izod impact strength test. The results are set forth in Table I.

TABLE I

| Example No. | Notched Izod (kgf-cm/cm) before soaking in gasoline | | Notched Izod (kgf-cm/cm) after soaking in gasoline | | HDTUL (°C.) |
|---|---|---|---|---|---|
| | 3.2 mm | 6.4 mm | 3.2 mm | 6.4 mm | |
| 1 | 76 | 6.1 | 8.3 | broke | 122.2 |
| 2 | 83 | 59.3 | 8.2 | 10.3 | 125.2 |
| 3 | 80 | 59.3 | 9.8 | 6.0 | 127.1 |
| 4 | 77 | 54.0 | 17.4 | 20.1 | 131.2 |
| 5 | 74 | 51.2 | 8.7 | 21.8 | 128.2 |

As illustrated by the data in Table I the instant compositions (Examples 2-5) impact strengths, particularly at thick sections, and better resistance to environmental stress crazing and cracking (better resistance to organic solvents), than the blend of polycarbonate/grafted derivative of ethylene-propylene-diene terpolymer (Example 1). This improvement in impact properties and resistance to organic solvents is obtained without sacrificing the HDTUL of these compositions. Indeed, these compositions exhibit higher HDTULs than the binary blend of Example 1.

Obviously, other modifications and variations of the invention, as described above, are possible in light of the instant disclosure. It is, therefore, to be understood that changes may be made in the particular embodiments shown without departing from the scope of the invention as defined in the appended claims.

What is claimed is:

1. An improved resin composition exhibiting improved resistance to organic solvents comprising (i) a blend comprised of at least one aromatic carbonate resin and at least one grafted derivative of an ethylene-propylene-diene terpolymer; the improvement comprising said composition additionally comprising (ii) an amount at least effective to improve the impact properties and resistance to organic solvents of said blend of a least one polymer selected from
    (a) a polyolefin,
    (b) an olefin-acrylate or methacrylate copolymer, or
    (c) a selectively hydrogenated linear, sequential or radial teleblock copolymer of a vinyl aromatic compound and an olefinic elastomer.
2. The composition of claim 1 wherein said grafted derivative of an ethylene-propylene-diene terpolymer is an ethylene-propylene-non-conjugated diene interpolymer grafted with the homopolymer or copolymer of monoethylenically unsaturated monomers having a phenyl, carbonyl or cyano group attached to a vinylic carbon.

3. The composition of claim 2 wherein said aromatic carbonate resin is a polycarbonate resin.

4. The composition of claim 3 wherein said polycarbonate resin contains at least one recurring structural unit represented by the formula

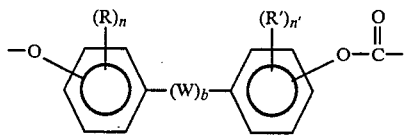

wherein
R and R' are independently selected from monovalent hydrocarbon radicals, monovalent hydrocarbonoxy radicals, or halogen radicals,
W is selected from divalent hydrocarbon radicals,

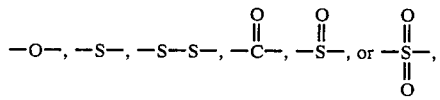

n and n' are independently selected from integers having a value of from 0 to 4 inclusive, and
b is either zero or one.

5. The composition of claim 4 wherein b is one.

6. The composition of claim 5 wherein W is selected from divalent hydrocarbon radicals.

7. The composition of claim 1 wherein said amount of (ii) is at least about 1 weight percent, based on the total amounts of (i) and (ii) present.

8. The composition of claim 7 wherein said amount of (ii) is at least about 2 weight percent.

9. The composition of claim 8 wherein said amount of (ii) is at least about 3 weight percent.

10. The composition of claim 1 wherein (ii) is (a).

11. The composition of claim 10 wherein said polyolefin is a linear low density polyethylene.

12. The composition of claim 11 wherein said grafted derivative of ethylene-propylene-diene terpolymer is a graft polymer of styrene-acrylonitrile on an ethylene-propylene-5-ethylidene-2norbornene chain.

13. The composition of claim 12 wherein said carbonate resin is a polycarbonate resin.

14. The composition of claim 13 wherein said polycarbonate resin is comprised of the reaction product of bisphenol-A and phosgene.

15. The composition of claim 1 wherein (ii) is (b).

16. The composition of claim 15 wherein (b) is at least one olefin monomer copolymerized with at least one of a comonomer selected from a $C_1$-$C_6$ alkyl acrylate, a $C_1$-$C_6$ alkyl methacrylate, acrylic acid, or methacrylic acid.

17. The composition of claim 16 wherein (b) is an ethylene ethylacrylate copolymer.

18. The composition of claim 17 wherein said grafted derivative of ethylene-propylene-diene terpolymer is a graft polymer of styrene-acrylonitrile on an ethylene-propylene-5-ethylidene-2-norbornene chain.

19. The composition of claim 18 wherein said carbonate resin is a polycarbonate resin.

20. The composition of claim 19 wherein said polycarbonate resin is comprised of the reaction product of bisphenol-A and phosgene.

21. The composition of claim 1 wherein (ii) is (c).

22. The composition of claim 21 wherein (c) is a selectively hydrogenated linear, sequential, or radial teleblock copolymer resin of a vinyl aromatic compound $A_c$ and $A'_c$ and an olefinic elastomer B of the A-B-A, A-(B-A-B)$_c$-A, A-(BA)$_c$-B, $A_4$B, $BA_4$, or B-((AB)$_c$B)$_4$ type, wherein c is an integer of from 1 to 10.

23. The composition of claim 22 wherein in d selectively hydrogenated block copolymer (c) A and A' are selected from styrene, alpha-methylstyrene, p-methylstyrene, vinyl toluene, vinyl xylene, or vinyl naphthylene and B is selected from butadiene, isoprene, 1,3-pentadiene, or 2,3-dimethylbutadiene.

24. The composition of claim 23 wherein in said selectively hydrogenated block copolymer resin A is a styrene block, B is a diolefin block, and A' is a styrene block.

25. The composition of claim 24 wherein in said slectively hydrogenated block copolymer terminal blocks A and A' each have weight average molecular weights of about 2,000 to about 60,000, and center block B has a weight average molecular weight of from about 20,000 to about 450,000.

26. The composition of claim 25 wherein said grafted derivative of ethylene-propylene-diene terpolymer is a graft polymer of styrene-acrylonitrile on an ethylene-propylene-5-ethylidene-2-norbornene chain.

27. The composition of claim 26 wherein said carbonate resin is a polycarbonate resin.

28. The composition of claim 27 wherein said polycarbonate resin is comprised of the reaction product of bisphenol-A and phosgene.

29. The composition of claim 1 which contains a flame retardant amount of at least one flame retardant compound.

30. The composition of claim 1 wherein said carbonate resin is a copolyester-carbonate resin.

31. The composition of claim 30 wherein said copolyester-carbonate resin is comprised of the reaction product of at least one dihydric phenol, a carbonate precursor, and at least one ester precursor.

32. The composition of claim 31 wherein said copolyester-carbonate resin contains from about 25 to about 90 mole percent ester bonds.

33. The composition of claim 32 wherein said ester precursor is selected from isophthalic acid, terephthalic acid, mixtures of isophthalic and terephthalic acids, or the ester forming reactive derivatives thereof.

34. The composition of claim 33 wherein said ester forming reactive derivatives are the acid dihalides.

35. The composition of claim 34 wherein said acid dihalides are the acid dichlorides.

36. The composition of claim 32 wherein (ii) is (a).

37. The composition of claim 32 wherein (ii) is (b).

38. The composition of claim 32 wherein (ii) is (c).

* * * * *